(12) United States Patent
Wang et al.

(10) Patent No.: US 11,962,493 B2
(45) Date of Patent: Apr. 16, 2024

(54) NETWORK ADDRESS TRANSLATION IN ACTIVE-ACTIVE EDGE CLUSTER

(71) Applicant: VMware LLC, Palo Alto, CA (US)

(72) Inventors: Yong Wang, San Jose, CA (US);
Jayant Jain, Cupertino, CA (US);
Ganesh Sadasivan, Fremont, CA (US);
Abhishek Goliya, Pune (IN)

(73) Assignee: VMware LLC, Palo Alto, CA (US)

( * ) Notice: Subject to any disclaimer, the term of this patent is extended or adjusted under 35 U.S.C. 154(b) by 81 days.

(21) Appl. No.: 17/845,716

(22) Filed: Jun. 21, 2022

(65) Prior Publication Data
US 2023/0412495 A1 Dec. 21, 2023

(51) Int. Cl.
*H04L 45/00* (2022.01)
*H04L 61/256* (2022.01)
*H04L 61/2596* (2022.01)

(52) U.S. Cl.
CPC ............ *H04L 45/38* (2013.01); *H04L 61/256* (2013.01); *H04L 61/2596* (2013.01)

(58) Field of Classification Search
CPC .................................... H04L 61/256–2596
See application file for complete search history.

(56) References Cited

U.S. PATENT DOCUMENTS

| | | | |
|---|---|---|---|
| 8,830,835 | B2 | 9/2014 | Casado et al. |
| 8,964,767 | B2 | 2/2015 | Koponen et al. |
| 9,137,052 | B2 | 9/2015 | Koponen et al. |
| 9,209,998 | B2 | 12/2015 | Casado et al. |
| 9,288,081 | B2 | 3/2016 | Casado et al. |
| 9,444,651 | B2 | 9/2016 | Koponen et al. |
| 9,755,960 | B2 | 9/2017 | Moisand et al. |
| 9,876,672 | B2 | 1/2018 | Casado et al. |

(Continued)

FOREIGN PATENT DOCUMENTS

| | | |
|---|---|---|
| CN | 101977156 A | 2/2011 |
| CN | 111478850 A | 7/2020 |

(Continued)

OTHER PUBLICATIONS

Non-Published Commonly Owned U.S. Appl. No. 17/212,662, filed Mar. 25, 2021, 37 pages, VMware, Inc.

(Continued)

*Primary Examiner* — Brendan Y Higa
(74) *Attorney, Agent, or Firm* — Quarles & Brady LLP

(57) ABSTRACT

Some embodiments provide a method for forwarding data messages at multiple edge gateways of a logical network that process data messages between the logical network and an external network. At a first edge gateway, the method receives a data message, having an external address as a destination address, from the logical network. Based on the destination address, the method applies a default route to the data message that routes the data message to a second edge gateway and specifies a first output interface of the first edge gateway for the data message. After routing the data message, the method applies a stored NAT entry that (i) modifies a source address of the data message to be a public NAT address associated with the first edge gateway and (ii) redirects the modified data message to a second output interface of the first edge gateway instead of the first output interface.

23 Claims, 7 Drawing Sheets

(56) References Cited

U.S. PATENT DOCUMENTS

| | | |
|---|---|---|
| 9,935,880 B2 | 4/2018 | Hammam et al. |
| 10,091,028 B2 | 10/2018 | Koponen et al. |
| 10,193,708 B2 | 1/2019 | Koponen et al. |
| 10,735,263 B1 | 8/2020 | McAlary et al. |
| 10,754,696 B1 | 8/2020 | Chinnam et al. |
| 10,931,481 B2 | 2/2021 | Casado et al. |
| 11,005,710 B2 | 5/2021 | Garg et al. |
| 11,005,963 B2 | 5/2021 | Maskalik et al. |
| 11,171,878 B1 | 11/2021 | Devireddy et al. |
| 11,212,238 B2 | 12/2021 | Cidon et al. |
| 11,240,203 B1 | 2/2022 | Eyada |
| 11,362,992 B2 | 6/2022 | Devireddy et al. |
| 11,582,147 B2 | 2/2023 | Raman et al. |
| 11,606,290 B2 | 3/2023 | Patel et al. |
| 11,729,094 B2 | 8/2023 | Arumugam et al. |
| 11,729,095 B2 | 8/2023 | Sadasivan et al. |
| 2007/0058604 A1 | 3/2007 | Lee et al. |
| 2008/0159150 A1 | 7/2008 | Ansari |
| 2009/0003235 A1 | 1/2009 | Jiang |
| 2009/0296713 A1 | 12/2009 | Kompella |
| 2009/0307713 A1 | 12/2009 | Anderson et al. |
| 2011/0126197 A1 | 5/2011 | Larsen et al. |
| 2011/0131338 A1 | 6/2011 | Hu |
| 2012/0054624 A1 | 3/2012 | Owens, Jr. et al. |
| 2012/0110651 A1 | 5/2012 | Biljon et al. |
| 2013/0044641 A1 | 2/2013 | Koponen et al. |
| 2013/0044751 A1 | 2/2013 | Casado et al. |
| 2013/0044752 A1 | 2/2013 | Koponen et al. |
| 2013/0044761 A1 | 2/2013 | Koponen et al. |
| 2013/0044762 A1 | 2/2013 | Casado et al. |
| 2013/0044763 A1 | 2/2013 | Koponen et al. |
| 2013/0044764 A1 | 2/2013 | Casado et al. |
| 2013/0142203 A1 | 6/2013 | Koponen et al. |
| 2013/0185413 A1 | 7/2013 | Beaty et al. |
| 2013/0283364 A1 | 10/2013 | Chang et al. |
| 2014/0282525 A1 | 9/2014 | Sapuram et al. |
| 2014/0334495 A1 | 11/2014 | Stubberfield et al. |
| 2014/0376367 A1 | 12/2014 | Jain et al. |
| 2015/0113146 A1 | 4/2015 | Fu |
| 2015/0193246 A1 | 7/2015 | Luft |
| 2016/0105392 A1 | 4/2016 | Thakkar et al. |
| 2016/0127202 A1 | 5/2016 | Dalvi et al. |
| 2016/0170809 A1 | 6/2016 | Schmidt et al. |
| 2016/0182336 A1 | 6/2016 | Doctor et al. |
| 2016/0234161 A1 | 8/2016 | Banerjee et al. |
| 2017/0033924 A1 | 2/2017 | Jain et al. |
| 2017/0063673 A1 | 3/2017 | Maskalik et al. |
| 2017/0195517 A1 | 7/2017 | Seetharaman et al. |
| 2017/0353351 A1 | 12/2017 | Cheng et al. |
| 2018/0270308 A1 | 9/2018 | Shea et al. |
| 2018/0287902 A1 | 10/2018 | Chitalia et al. |
| 2018/0295036 A1 | 10/2018 | Krishnamurthy et al. |
| 2018/0332001 A1 | 11/2018 | Ferrero et al. |
| 2019/0068500 A1 | 2/2019 | Hira |
| 2019/0104051 A1 | 4/2019 | Cidon et al. |
| 2019/0104413 A1 | 4/2019 | Cidon et al. |
| 2019/0149360 A1 | 5/2019 | Casado et al. |
| 2019/0149463 A1 | 5/2019 | Bajaj et al. |
| 2019/0327112 A1 | 10/2019 | Nandoori et al. |
| 2019/0342179 A1 | 11/2019 | Barnard et al. |
| 2021/0067375 A1 | 3/2021 | Cidon et al. |
| 2021/0067439 A1 | 3/2021 | Kommula et al. |
| 2021/0067468 A1 | 3/2021 | Cidon et al. |
| 2021/0075727 A1 | 3/2021 | Chen et al. |
| 2021/0112034 A1 | 4/2021 | Sundararajan et al. |
| 2021/0126860 A1 | 4/2021 | Ramaswamy et al. |
| 2021/0136140 A1 | 5/2021 | Tidemann et al. |
| 2021/0184898 A1 | 6/2021 | Koponen et al. |
| 2021/0314291 A1* | 10/2021 | Chandrashekhar ..... H04L 45/44 |
| 2021/0314388 A1 | 10/2021 | Zhou et al. |
| 2021/0336886 A1 | 10/2021 | Vijayasankar et al. |
| 2021/0359948 A1 | 11/2021 | Durrani et al. |
| 2022/0094666 A1 | 3/2022 | Devireddy et al. |
| 2022/0311707 A1 | 9/2022 | Patel et al. |
| 2022/0311714 A1 | 9/2022 | Devireddy et al. |
| 2022/0377009 A1 | 11/2022 | Raman et al. |
| 2022/0377020 A1 | 11/2022 | Sadasivan et al. |
| 2022/0377021 A1 | 11/2022 | Sadasivan et al. |
| 2023/0006920 A1 | 1/2023 | Arumugam et al. |
| 2023/0006941 A1 | 1/2023 | Natarajan et al. |
| 2023/0239238 A1 | 7/2023 | Patel et al. |
| 2023/0262022 A1* | 8/2023 | Wang .................. G06F 9/45558 709/245 |

FOREIGN PATENT DOCUMENTS

| | | |
|---|---|---|
| WO | 2013026050 A1 | 2/2013 |
| WO | 2022060464 A1 | 3/2022 |
| WO | 2022250735 A1 | 12/2022 |

OTHER PUBLICATIONS

Non-published commonly owned U.S. Appl. No. 17/344,956, filed Jun. 11, 2021, 61 pages, VMware, Inc.

Non-published commonly owned U.S. Appl. No. 17/344,958, filed Jun. 11, 2021, 62 pages, VMware, Inc.

Non-published commonly owned U.S. Appl. No. 17/344,959, filed Jun. 11, 2021, 61 pages, VMware, Inc.

Non-Published Commonly Owned U.S. Appl. No. 17/365,960, filed Jul. 1, 2021, 32 pages, VMware, Inc.

Non-Published Commonly Owned U.S. Appl. No. 17/366,676, filed Jul. 2, 2021, 32 pages, VMware, Inc.

Non-Published Commonly Owned U.S. Appl. No. 17/839,336, filed Jun. 13, 2022, 50 pages, VMware, Inc.

Non-Published Commonly Owned U.S. Appl. No. 18/235,869, filed Aug. 20, 2023, 50 pages, VMware, Inc.

Non-Published Commonly Owned U.S. Appl. No. 18/235,874, filed Aug. 20, 2023, 69 pages, VMware, Inc.

Non-Published Commonly Owned U.S. Appl. No. 18/119,208, filed Mar. 8, 2023, 46 pages, VMware, Inc.

* cited by examiner

NETWORK ADDRESS TRANSLATION IN ACTIVE-ACTIVE EDGE CLUSTER

BACKGROUND

Logical networks implemented in datacenters often include gateways implemented on edge nodes that provide services to data traffic sent between the logical network and external networks. If these services are stateful, the gateways have typically been implemented in an active-standby configuration such that only one of the edge nodes is active at a time. In this configuration, traffic originating from the logical network and traffic originating from the external network is all sent to the same active edge node. However, the single active edge node can be a bottleneck, so an active-active configuration in which traffic is split among the multiple active edge nodes is especially preferable for networks with a large amount of such "north-south" traffic (e.g., applications such as a virtual desktop interface that receive thousands or even millions of connections from outside users).

BRIEF SUMMARY

Some embodiments provide a method for performing network address translation (NAT) at a set of edge nodes that implement a logical router gateway for processing data messages between a logical network and an external network in an active-active configuration. Specifically, even when a default route at each of the edge nodes directs outgoing data messages to a single one of the edge nodes (e.g., because that edge node is used as a single edge node for virtual private network (VPN) services, domain name services, or other services), NAT entries stored at the other gateways redirect outgoing data messages such that these messages are output directly to the external network rather than sent to the other edge node.

When a particular one of the edge nodes receives an incoming data message initiating a connection to a workload (e.g., a VM, container, etc.) in the logical network, the particular edge node performs NAT on the data message and stores a NAT entry that can be used for subsequent incoming and outgoing data messages of the same flow. The incoming data message typically has a public NAT network address (e.g., IP address) associated with the particular edge node as its destination network address. The edge node datapath processing (implementing the logical router gateway) identifies that destination NAT (DNAT) should be performed on the incoming data message and translates the public NAT address into a logical network address associated with a workload in the logical network. This may involve load balancing between multiple addresses or performing a 1:1 address translation.

As indicated, the edge node datapath also stores a NAT entry to be used for subsequent incoming and outgoing data messages. For subsequent incoming data messages of the same flow, the NAT entry ensures that the same logical network address is used. For outgoing data messages, the NAT entry ensures that the logical network address is translated back into the public NAT address after the data messages are routed.

However, in some embodiments, the routing performed by the edge node datapath for outgoing data messages routes these data messages to a specific one of the edge nodes according to a default route (e.g., based on the provision of VPN, DNS, or other services at the specific edge node that are not scaled to all of the nodes in the cluster). However, the connections on which NAT is being performed (i) do not need these services applied and (ii) should be output by the particular edge node that performs the DNAT and stores the stateful entry. One option to handle this problem is for the edge node datapath to generate a new routing table entry for each of these connections that routes data traffic for the connection to an external router (e.g., based on this data traffic having the source network address of the initial incoming data message as its destination network address). However, this technique can become difficult to manage when the number of connections is large, as a new route needs to be defined for each external address that connects to the logical network workloads.

Instead, some embodiments store information along with the NAT entry (applied to outgoing data messages after the routing operation) that redirects the data message to a different output interface. Rather than outputting the data message via an interface used for communication with other edge nodes in the cluster, the particular edge node outputs the data message via an uplink interface connected to the external network (i.e., the interface via which the initial incoming data message was received). Some embodiments accomplish this redirection by modifying the source (and destination) media access control (MAC) address of the outgoing data message. Specifically, when the initial incoming message is received, the data link layer (e.g., Ethernet) header is stored along with the NAT entry, but with the source and destination MAC addresses reversed (so that the header can be used for outgoing data traffic instead). After the data message has already been routed (which typically involves setting the source and destination MAC addresses based on the routing), the layer 2 header of the data message is replaced with this stored layer 2 header. Because the source MAC address of the data message now corresponds to the uplink interface, the data message is output via this uplink interface rather than the internal interface of the edge node connecting to the other edge nodes.

In some embodiments, the edge nodes are part of a virtual datacenter that is configured on a set of host computers in a public cloud. In some embodiments, the virtual datacenter is defined within virtual private clouds (VPCs) of the public cloud. A VPC, in some embodiments, is a set of workloads that are allocated to the tenant of the public cloud (e.g., an enterprise) and that are isolated from workloads of other tenants. In some embodiments, for a virtual datacenter, the tenant VPC is allocated a set of physical host computers of the public cloud that only host workload data compute nodes (e.g., virtual machines (VMs), containers, etc.) that are part of the tenant virtual datacenter (i.e., the physical host computers are not shared with other tenants of the public cloud). Within the VPC, the tenant logical network is defined, to which the tenant workloads connect.

The workloads of the virtual datacenter, in some embodiments, include a set of network management components (e.g., network manager(s) and/or controller(s), compute manager(s), etc.), a set of logical network endpoints (e.g., on which applications operate), and a set of edge gateways that process data traffic between the workloads of the virtual datacenter and the external entities (e.g., clients connecting to servers implemented at the logical network endpoints). In such an environment, the workload endpoints may host one or more application gateways that provide access for virtual desktop clients to various applications, in some embodiments. The edge nodes advertise their public NAT addresses that correspond to these application gateways, thereby attracting virtual desktop client traffic for the application gateways.

It should be noted that, in some embodiments, different edge nodes in the cluster use different public NAT addresses. In some embodiments, the edge nodes are divided into multiple groups, with each group implementing a separately-defined logical router. In this scenario, one of the edges in a default group is designated as the default edge node (e.g., for VPN, DNS, etc.) and the other edge nodes in all groups are configured with default routes to the default edge node, as described above. In some embodiments, each of the groups uses a different public NAT address that corresponds to a different application gateway workload. In some such embodiments, one of the edge nodes in each group is designated as the active edge node for the group with any other edge nodes in the group designated as standby edge nodes. In other embodiments, each edge node is active and uses a different public NAT address (i.e., such that there are multiple NAT addresses within a group), each of which may correspond to a different application gateway workload.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and the Drawings is needed. Moreover, the claimed subject matters are not to be limited by the illustrative details in the Summary, Detailed Description, and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a method for performing network address translation (NAT) at a set of edge nodes that implement a logical router gateway for processing data messages between a logical network and an external network in an active-active configuration. Specifically, even when a default route at each of the edge nodes directs outgoing data messages to a single one of the edge nodes (e.g., because that edge node is used as a single edge node for virtual private network (VPN) services, domain name services, or other services), NAT entries stored at the other gateways redirect outgoing data messages such that these messages are output directly to the external network rather than sent to the other edge node.

In some embodiments, the edge nodes are part of a virtual datacenter that is configured on a set of host computers in a public cloud. In some embodiments, the virtual datacenter is defined within virtual private clouds (VPCs) of the public cloud. A VPC, in some embodiments, is a set of workloads that are allocated to the tenant of the public cloud (e.g., an enterprise) and that are isolated from workloads of other tenants. In some embodiments, for a virtual datacenter, the tenant VPC is allocated a set of physical host computers of the public cloud that only host workload data compute nodes (e.g., virtual machines (VMs), containers, etc.) that are part of the tenant virtual datacenter (i.e., the physical host computers are not shared with other tenants of the public cloud). Within the VPC, the tenant logical network is defined, to which the tenant workloads connect.

Figure 1:
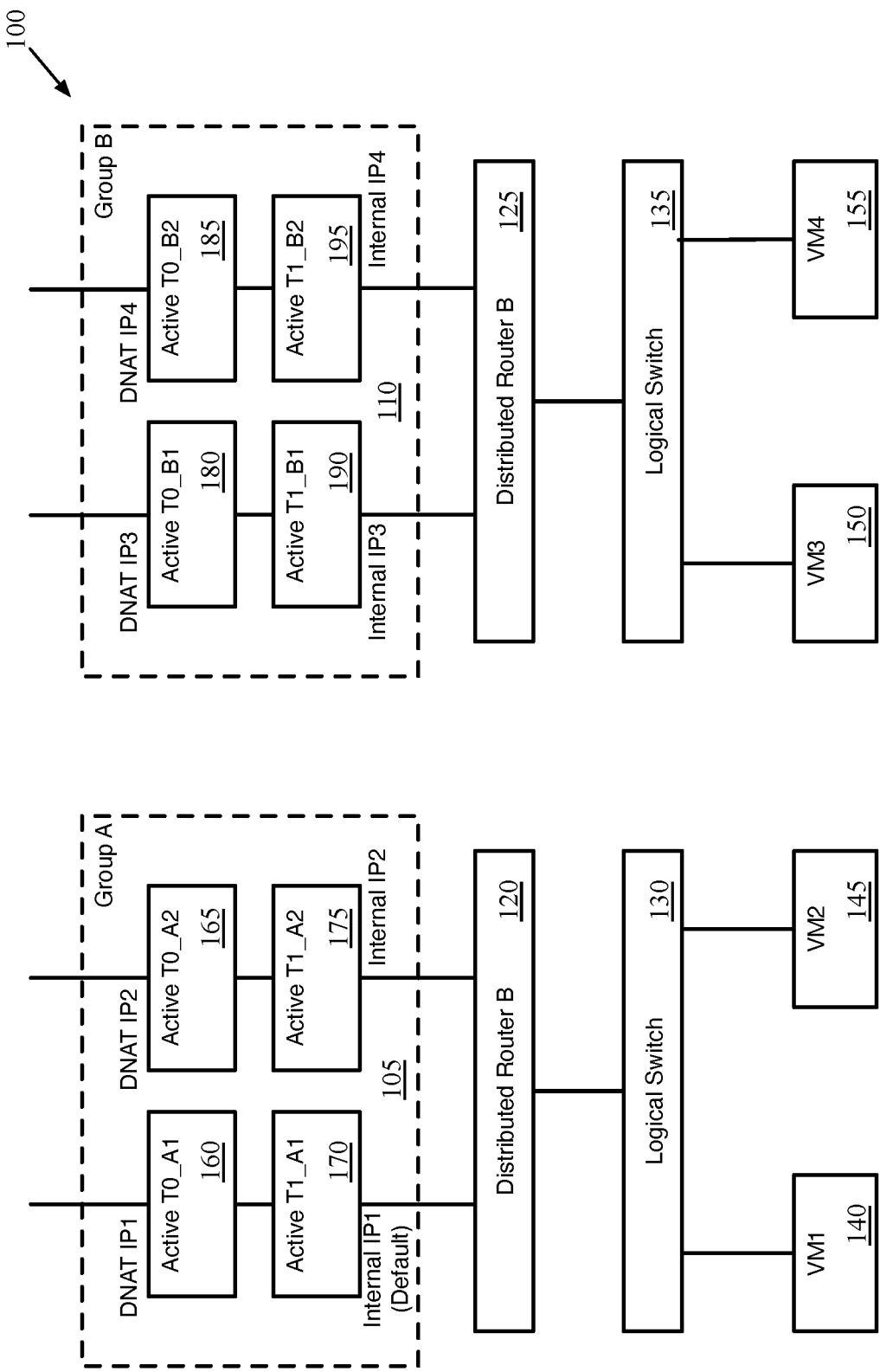
FIG. 1 conceptually illustrates a logical network for a virtual datacenter of some embodiments.

FIG. 1 conceptually illustrates a logical network 100 for a virtual datacenter of some embodiments. As shown, the logical network 100 is defined to include two traffic groups 105 and 110 of logical router gateways, two distributed routers 120 and 125, and two logical switches 130 and 135. Two VMs 140 and 145 connect to the first logical switch 130 and two VMs 150 and 155 connect to the second logical switch 135.

In this example, each of the traffic groups 105 and 110 is defined to include a group of edge nodes that implements two or more tier-0 (T0) logical router gateways and corresponding tier-1 (T1) logical router gateways. In some embodiments, T0 logical router gateways handle traffic entering and exiting the logical network 100 (i.e., entering or exiting the virtual datacenter), which may include traffic sent to and from an on-premises datacenter, traffic sent to and from services provided by the public cloud provider for the public cloud at which the virtual datacenter is implemented, traffic between the workloads of the virtual datacenter (e.g., VMs 140-155) and client devices that connect to the virtual datacenter via the public Internet, etc. T1 logical routers handle traffic between workloads that are not connected to the same logical switch in some embodiments, enabling groups of these workloads to be segregated from each other.

In this case, the first traffic group 105 includes two T0 logical routers 160 and 165 as well as two T1 logical routers 170 and 175. For the purposes of implementation (as shown in the subsequent FIG. 2), the logical router gateways are grouped into edge nodes. That is, a first edge node implements the T0 logical router 160 and the T1 logical router 170 while a second edge node implements the T0 logical router 165 and the T1 logical router 175. These logical routers are configured in active-active configuration, meaning that both of the edge nodes can receive and process traffic between the logical network 100 and external networks. Similarly, the second traffic group 110 includes two T0 logical routers 180 and 185 as well as two T1 logical routers 190 and 195. In this case, a third edge node implements the T0 logical router 180 and the T1 logical router 190 while a fourth edge node implements the T0 logical router 185 and the T1 logical router 195.

In some embodiments, each of the traffic groups 105 and 110 corresponds to a single pair of T0 and T1 logical routers. That is, each of the T0 logical routers 160 and 165 are instances of the same logical router and each of the T1 logical routers 170 and 175 are centralized components of the same T1 logical router. In this case, the first distributed router 120 is a distributed component of the same T1 logical router as the centralized components 170 and 175 while the second distributed router 125 is a distributed component of the same T1 logical router as the centralized components 190 and 195.

Each of the logical switches 130 and 135 has two connected workloads. Although these are shown as VMs, in different embodiments they could be containers, bare metal computers, or other data compute nodes (DCNs). The first two VMs 140 and 145 can communicate without any logical router processing, as can the latter two VMs 150 and 155. However, for one of the first two VMs 140 and 145 to communicate with one of the latter two VMs 150 and 155, data messages are required to travel through the edge nodes for at least T1 logical router processing in some embodiments.

In this example, the traffic groups 105 and 110 are configured in active-active configuration such that each of the T0 logical routers (and thus each of the edge nodes implementing the logical router gateways) is designated as active. In this case, each of the edge nodes is assigned an uplink interface with its own public network address (shown as DNAT IP1, DNAT IP2, DNAT IP3, and DNAT IP4). In some embodiments, each of the workloads (the VMs 140-155) is a server (e.g., an application gateway) to which external client devices connect. In some such embodiments, each of these workloads corresponds to a different one of the public network addresses assigned to (and advertised by) the edge node uplink interfaces, with the edge nodes performing network address translation (NAT) to translate their respective public network address into the corresponding internal workload network address for incoming traffic (and vice versa for outgoing traffic). This NAT process is described further below.

In other embodiments, the traffic groups are configured in active-standby configuration such that each traffic group includes one active T0 logical router and one standby T0 logical router. In this case, each of the uplink interfaces in a given traffic group shares a single public network address. Thus, for example, the uplink interfaces in the first traffic group 105 would both be assigned DNAT IP1 and the uplink interfaces in the second traffic group 110 would both be assigned DNAT IP2. In some such embodiments, only one of the edge nodes (i.e., the active edge node) in each traffic group advertises its public network address. In addition, in some such embodiments, only one workload is instantiated in the virtual datacenter to correspond to each public network address. In other embodiments, multiple workloads are instantiated to correspond to each public network address, with the edge nodes also load balancing across the multiple workloads.

Each edge node is also assigned an internal network address used for communication within the virtual datacenter. In some embodiments, irrespective of whether the traffic groups are configured in active-active or active-standby mode, each of the edge nodes is assigned a different internal network address. In some embodiments, each of the edge nodes has two separate internal interfaces with separate network addresses. One of these internal addresses is used by the logical network as a next hop for sending traffic from the workloads to the edge nodes (and as an output interface for traffic being sent from external networks to the workloads) and a second internal address is used for traffic being sent from one edge node to another.

In addition, one of the T0 logical routers (and thus one of the edge nodes) is designated as a default edge node (in this case, the first T0 logical router 160) in some embodiments. The default T0 logical router, in some embodiments, provides services that are not scaled across all of the edge nodes, such as virtual private network (VPN) services, domain name service (DNS), and other services. Based on this assignment, routing tables for each of the other T0 logical routers are configured with default routes that route otherwise unknown traffic (e.g., data messages to external clients) to the default router.

Figure 2:
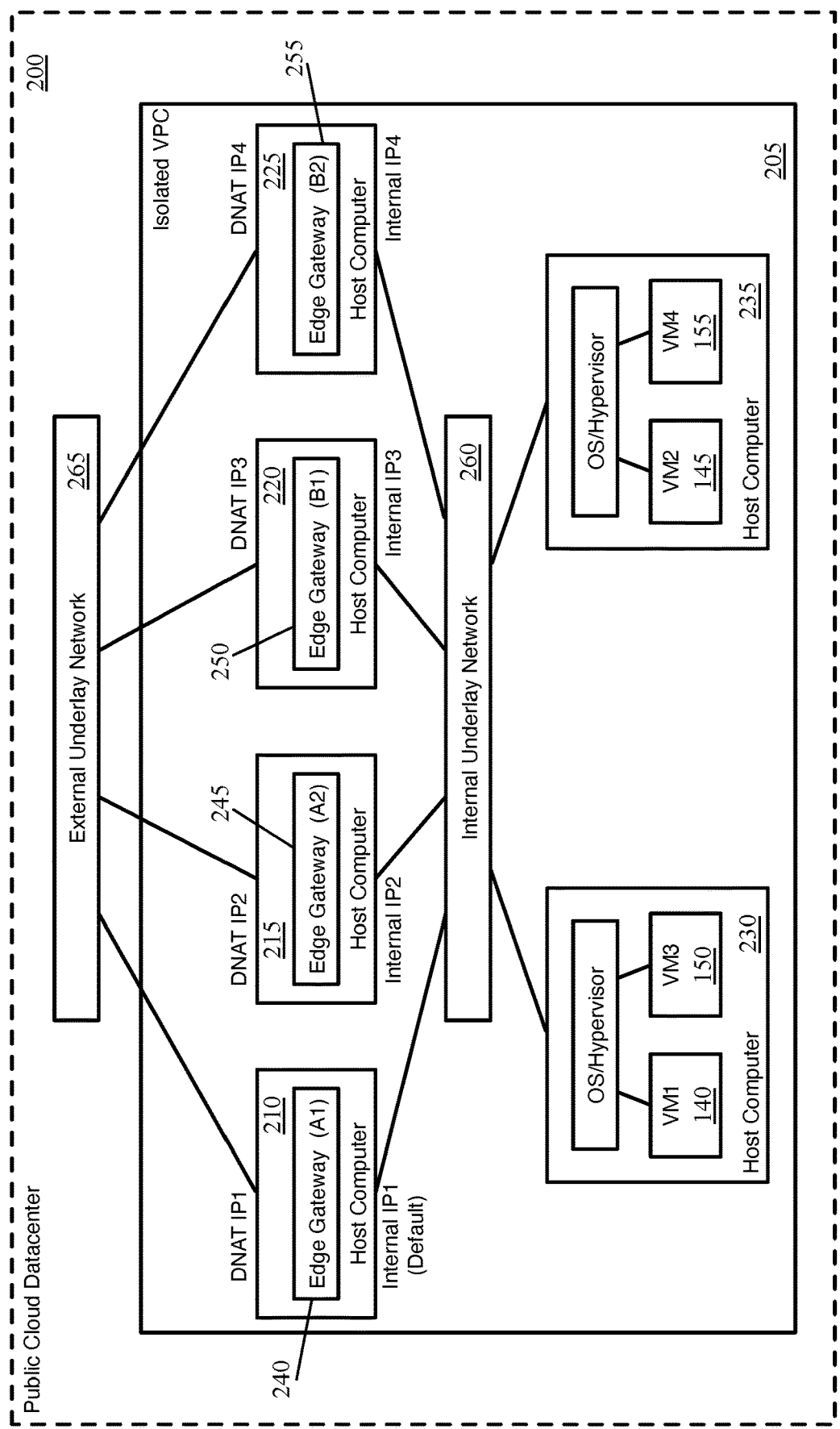
FIG. 2 conceptually illustrates a physical implementation of the virtual datacenter of FIG. 1 in a public cloud datacenter according to some embodiments.

FIG. 2 conceptually illustrates a physical implementation of the virtual datacenter of FIG. 1 in a public cloud datacenter 200 according to some embodiments. As mentioned above, some embodiments implement a virtual datacenter such as that shown in FIG. 1 within a VPC of a public cloud datacenter. This figure shows that the virtual datacenter is implemented in an isolated VPC 205 of the public cloud datacenter 200. In some embodiments, this VPC 205 is allocated not just a set of VMs or other DCNs that execute on host computers managed by the public cloud provider and potentially shared with other tenants of the public cloud, but rather a set of host computers 210-235 of the public cloud datacenter 200. This allows network and/or compute management DCNs (not shown in this figure) to manage the hypervisors and other software of the host computers 210-220 (e.g., so that these hypervisors implement the virtual datacenter logical network 100).

As shown, two of the workloads 140-155 execute on each of the host computers 230 and 235 (e.g., on top of a hypervisor that executes on the host). In this example, one of the VMs connected to each of the logical switches executes on each of these host computers 230-235. However, in other embodiments, all of the workloads could execute on the same host computer or on completely different computers.

In addition, some embodiments assign each of the edge nodes 240-255 to a separate one of the host computers 210-225. The edge nodes 240-255 in some embodiments are VMs or other virtualized DCNs that execute datapaths to implement their respective T0 and T1 logical routers, while in other embodiments each edge node is a datapath executing on a bare metal host computer to implement these components. Some embodiments require that each edge node execute on a separate host computer for redundancy, though in some embodiments this allows for edge nodes to execute on the same host computers as the workloads.

The host computers 210-235 communicate with each other via an internal underlay network 260 of the cloud provider. As such, data traffic sent between the workloads 140-155 and external networks (and thus to the edge nodes 240-255) is routed by this underlay network 260. In some embodiments, to ensure that data sent by each of the workloads is routed by the underlay network 260 to the correct edge node (i.e., the respective edge node to which each respective workload is correlated for DNAT purposes), the underlay is configured to use policy-based routing that routes certain traffic based on the source network address rather than the destination network address. Specifically, the underlay is configured to route data traffic sent from VM1 to the next hop interface with Internal IP1, data traffic sent from VM2 to the next hop interface with Internal IP2, data traffic sent from VM3 to the next hop interface with Internal IP3, and data traffic sent from VM4 to the next hop interface with Internal IP4. In the active-standby case, traffic is only routed to the active edge nodes.

The edge nodes 240-255 also communicate (in some cases via additional routers within the VPC 205) with the external underlay network 265. In some embodiments, the internal underlay network 260 and external underlay network 265 are in actuality the same physical underlay network of the public cloud provider but are represented differently here as different interfaces of the edge node host computers connect internally and externally. In some embodiments, the external underlay network is configured to route data traffic sent to the different public DNAT IP addresses to the corresponding host computers. In addition, in some embodiments each of the edge nodes is required to use a different public network address because the public cloud underlay network is not capable of performing ECMP routing.

As mentioned, each of the non-default edge nodes 245-255 is configured with a default route that routes data messages with unknown destination network addresses (e.g., data messages directed to external network addresses) to the default edge node 240. It is in this context that the edge nodes are configured to generate and store NAT entries that cause post-routing redirection of outgoing data messages that require reverse DNAT (i.e., translation of the source network address) so that these messages are sent out of the externally-facing interface of the edge node that performs NAT rather than sent to the default edge node.

When a particular one of the edge nodes receives an incoming data message initiating a connection to a workload in the logical network, that edge node performs NAT on the data message and stores a NAT entry that can be used for subsequent incoming and outgoing data messages of the same flow. In addition, the NAT entry (or an associated entry) is used to ensure that return data messages are output from that edge node to the external network rather than redirected to a default edge node.

Figure 3:
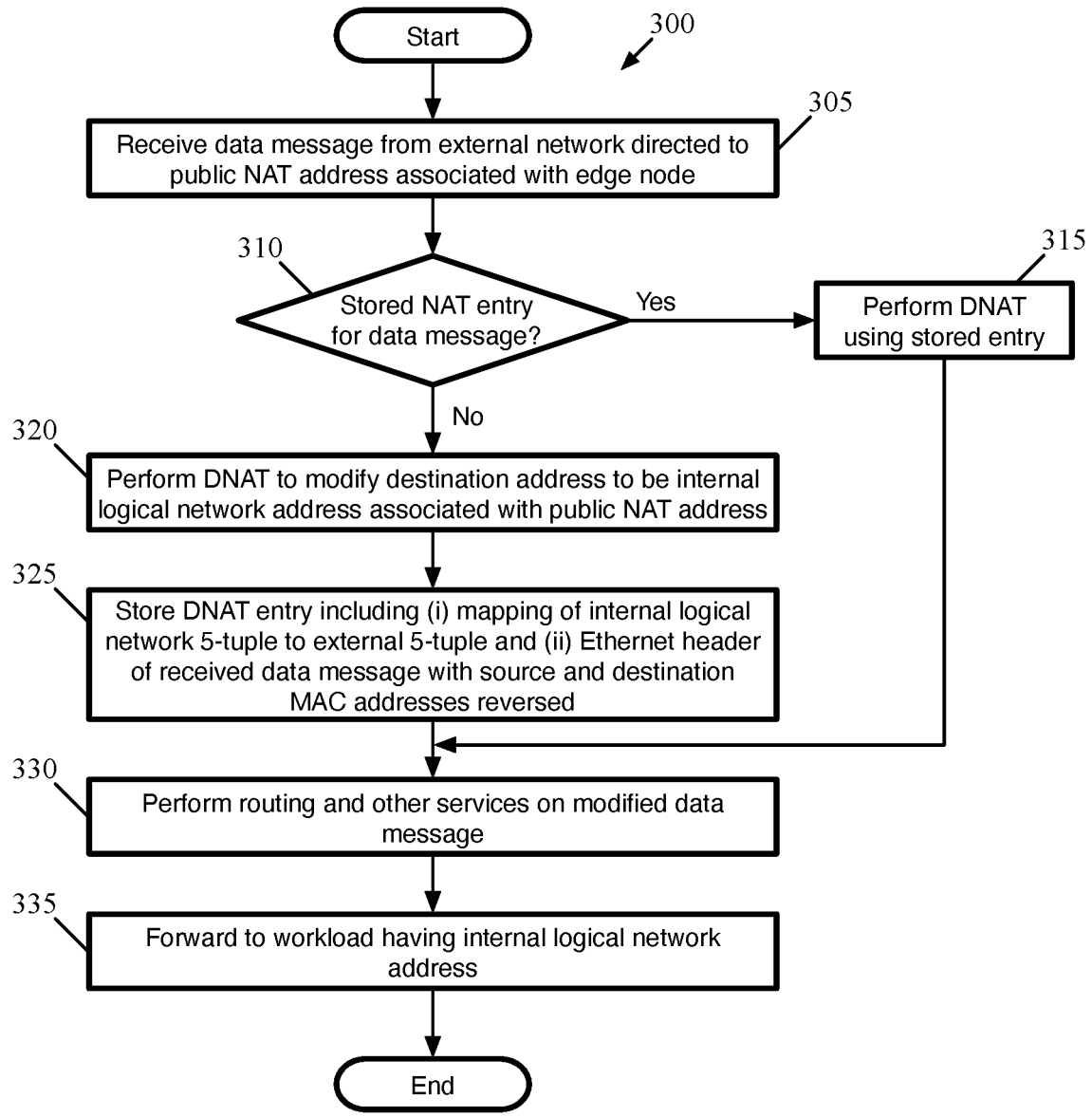
FIG. 3 conceptually illustrates a process of some embodiments for performing NAT and generating a NAT entry for a data message received at an edge node from the external network.

FIG. 3 conceptually illustrates a process 300 of some embodiments for performing NAT and generating a NAT entry for a data message received at an edge node from the external network. In some embodiments, the process 300 is performed by an edge node (e.g., the datapath executed by the edge node) while implementing a T0 logical router. The process 300 will be described in part by reference to FIG. 4, which conceptually illustrates creation of a NAT entry based on processing of a connection-initiation data message at an edge node.

Figure 4:
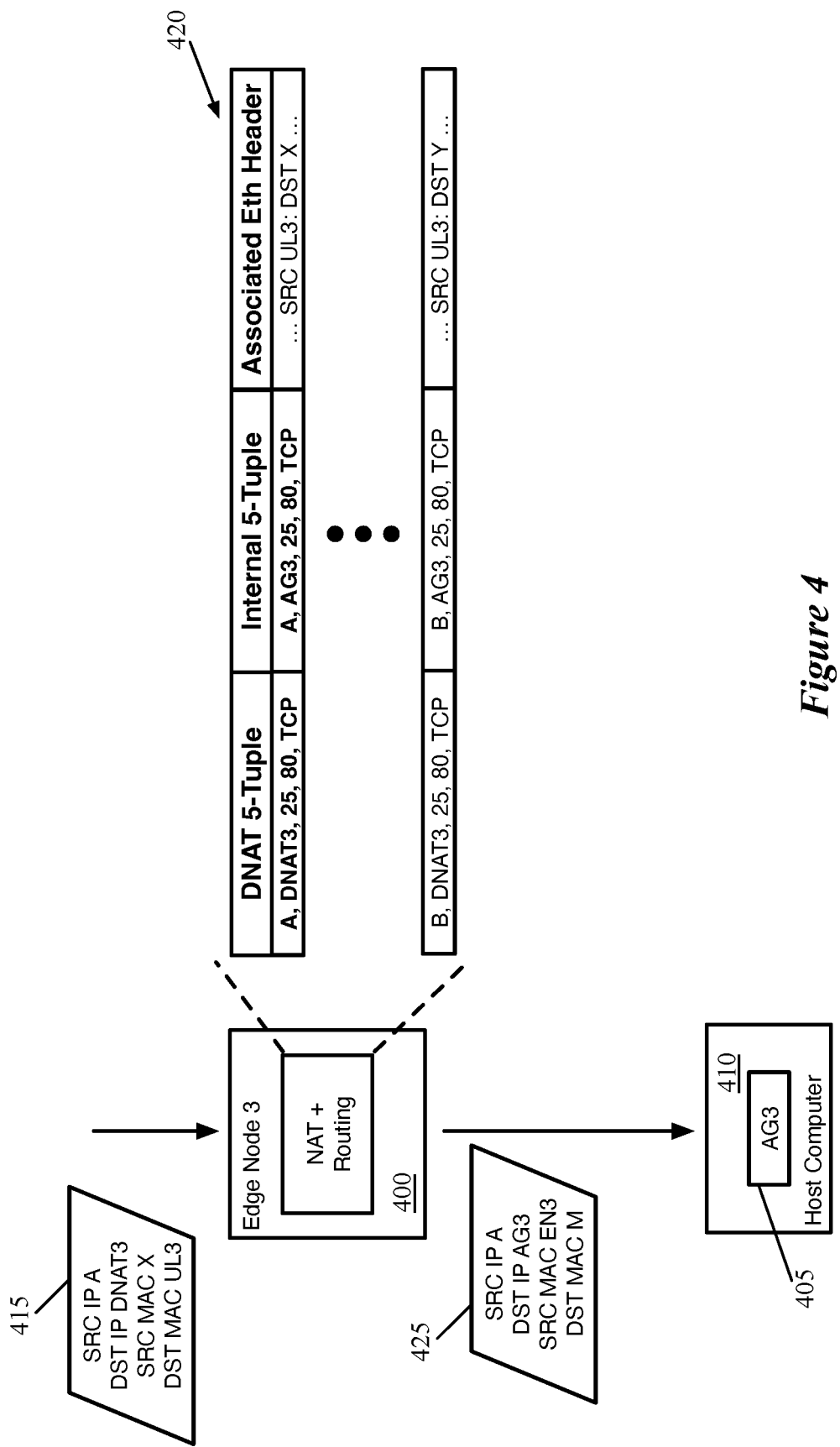
FIG. 4 conceptually illustrates creation of a NAT entry based on processing of a connection-initiation data message at an edge node.

FIG. 4 illustrates an edge node 400 that is one of a cluster of edge nodes for a virtual datacenter (e.g., the system shown in FIGS. 1 and 2). The edge node 400 has a public uplink IP address of DNAT3 and performs NAT and routing (as well as potentially other services) for traffic sent to and from an application gateway 405 that executes on a host computer 410 in the virtual datacenter. In some embodiments, the logical network workloads are application gateways that provide access for virtual desktop clients to various applications (e.g., secure e-mail servers, web applications such as company internal wikis, internal file repositories, etc.). These application gateways may receive hundreds or even thousands of regular connections from different users, depending on the size of the enterprise that provides these applications, so the use of multiple application gateways (and therefore multiple edge nodes) can be important.

As shown, the process 300 begins by receiving (at 305), at an edge node, a data message from an external network directed to the public NAT address associated with the edge node. The public NAT address, in some embodiments, is advertised by the edge node to the external network. In some embodiments, the edge node advertises the public NAT address to the public cloud underlay of the public cloud datacenter within which the edge node (and the virtual datacenter of which the edge node is a part) is implemented. The public cloud underlay connects to external networks (e.g., the Internet) and advertises the public NAT address externally so as to attract data traffic sent to that address. Referring to FIG. 4, the edge node 400 receives a connection initiation data message 415 sent from source IP A to destination IP. Based on the routing by the public cloud underlay, when received at the edge node uplink interface, this data message 415 has a source MAC address X and a destination MAC address UL3 (i.e., the MAC address of the uplink interface).

Because the data message is sent to the public DNAT address, the datapath of the edge node datapath implementing the T0 logical router gateway identifies that DNAT should be performed on the incoming data message. The process 300 determines (at 310) whether a stored NAT entry currently exists for the data message. As described further below, in some embodiments each edge node stores stateful NAT entries for each ongoing connection for which the edge node performs NAT. These NAT entries indicate connections for which NAT has been performed as well as the IP address and port number changes and, in some embodiments, redirection instructions for outgoing data messages. In some embodiments, the stored NAT entry is matched based on a 5-tuple of the incoming data message (i.e., the source and destination IP addresses, source and destination transport layer port numbers, and transport protocol). Other embodiments use a subset of these header values (e.g., a 4-tuple that ignores the source port) or a different set of header values to match data messages to NAT entries.

If a stored NAT entry matching the data message is found, the process 300 performs (at 315) DNAT using the matched NAT entry. The edge datapath modifies the destination network address to be that of the logical network workload (i.e., a private IP address) rather than the public NAT address. In addition, if necessary, the source and/or destination port numbers are changed.

If no such NAT entry is found, the process performs (at 320) DNAT to modify the destination address to be the internal logical network address associated with the public NAT address. In some embodiments, the edge datapath only performs DNAT if the data message is a connection initiation message (e.g., a SYN message starting a TCP 3-way handshake). Though not shown in the flow chart, the edge datapath drops data messages that do not belong to ongoing connections for which stateful NAT entries exist unless these are messages initiating a new connection. In other embodiments, this stateful operation is performed as part of a stateful firewall later in the processing pipeline.

In addition to performing DNAT, the process 300 stores (at 325) a DNAT entry that includes (i) a mapping of the internal logical network 5-tuple (after DNAT) to the external 5-tuple (before DNAT) and (ii) the Ethernet header of the received data message with the source and destination MAC addresses reversed. The first part of the DNAT entry enables the edge node to properly perform NAT on future data messages for the connection in both directions (e.g., as described at operation 315). For subsequent incoming data messages of the same flow, this NAT entry ensures that the same logical network address is used. For outgoing data messages, the NAT entry ensures that the logical network address is translated back into the public NAT address after the data messages are routed.

FIG. 4 shows that a new DNAT entry is created in the NAT table 420 (the new entry is shown in bold). This entry maps the external 5-tuple of the received data message 415 with source IP A, destination IP DNAT3, source port number 25, destination port number 25, and transport protocol TCP to an internal logical network 5-tuple with only the destination IP modified to AG3 (the IP address of the application gateway workload 405). Each of the entries also includes an associated Ethernet header that is used to redirect outgoing data messages. For the new entry, the header has a source MAC address UL3 (the uplink interface) and a destination MAC address X. These addresses are reversed from the incoming data message 415, but the rest of the header is the same in some embodiments. The use of these Each of the NAT entries includes such an Ethernet (or other data link layer) header to be used for outgoing data messages. The edge node copies the Ethernet header from the incoming data message, then switches the source and destination MAC addresses, as the outgoing data message should have the same values for the other fields of the Ethernet header. In some embodiments, as described further below, the edge node uses these stored Ethernet headers to redirect the outgoing data messages.

Returning to FIG. 3, the process 300 then performs (at 330) routing and other services on the modified data message. In some embodiments, the edge datapath is configured to perform routing after NAT for incoming data messages, which enables the edge datapath to route the data message based on the translated (internal) destination network address rather than the public NAT address. In addition, the datapath performs other services, which can include application of edge firewall rules and/or other services. The datapath also, in some embodiments, performs additional logical forwarding operations (e.g., to implement the distributed logical router, logical switch, etc.).

Finally, based on these forwarding operations, the process 300 forwards (at 335) the data message to the workload having the internal logical network address (i.e., the destination address of the data message after NAT), then ends. In some embodiments, this involves forwarding the data message to a different host computer on which the application gateway executes via the public cloud underlay network. FIG. 4 shows the modified data message 425 (with destination IP address AG3 rather than DNAT3) being sent (through the public cloud underlay network) to the host computer 410 on which the application gateway workload 405 executes.

Figure 5:
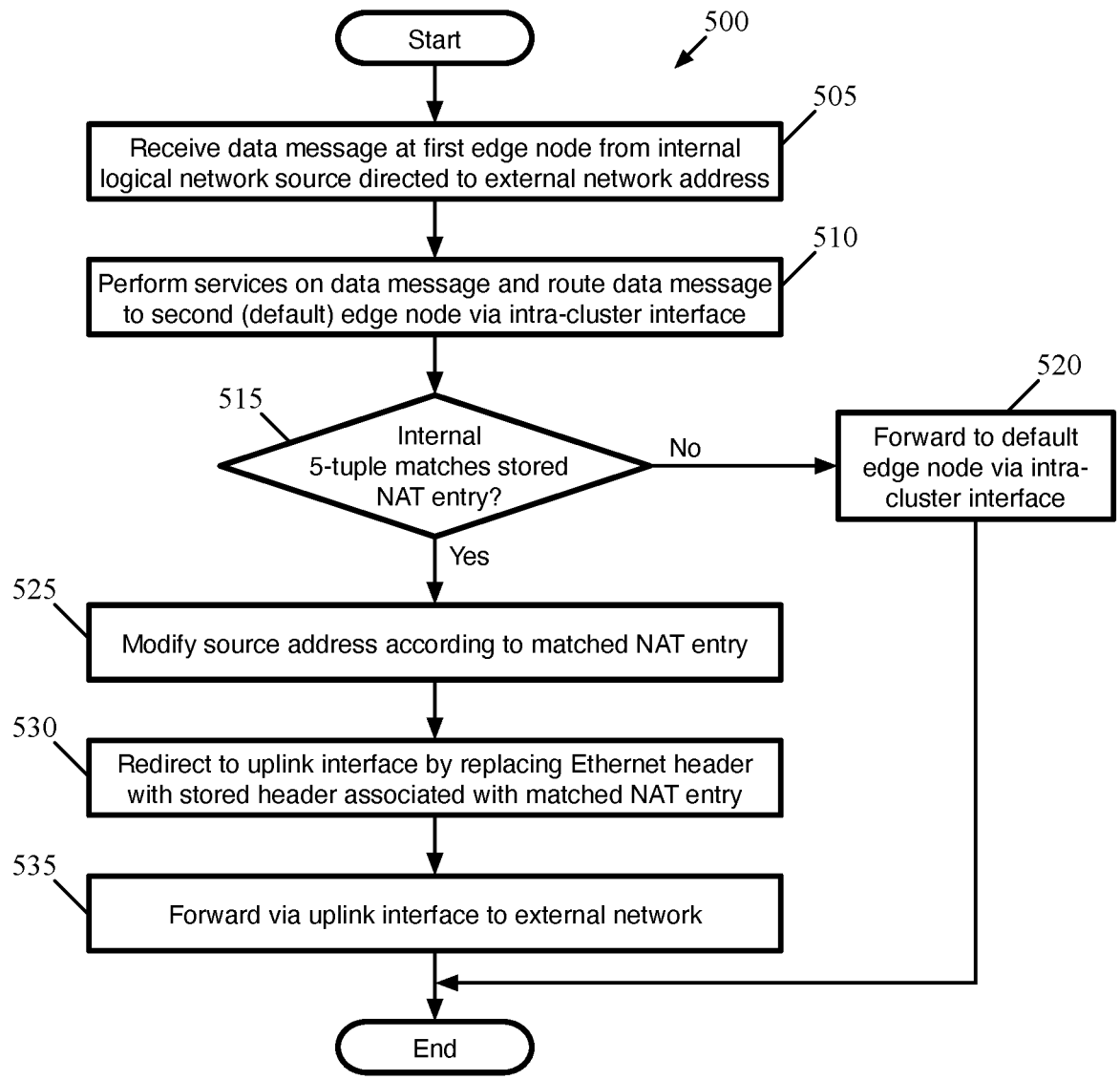
FIG. 5 conceptually illustrates a process of some embodiments for performing NAT on a data message received at an edge node from the internal logical network and directed to an external destination.

FIG. 5 conceptually illustrates a process 500 of some embodiments for performing NAT on a data message received at an edge node from the internal logical network and directed to an external destination (e.g., to a client that has setup a connection with a logical network workload). In some embodiments, the process 500 is performed by an edge node (e.g., the datapath executed by the edge node) as part of its implementation of a T0 logical router. The process 500 will be described in part by reference to FIG. 6, which conceptually illustrates the use of the NAT entry created in FIG. 4 for a return data message.

As shown, the process 500 begins by receiving (at 505) a data message at a first edge node from an internal logical network source that is directed to an external network address. In some embodiments, this data message is sent by a logical network workload (e.g., an application gateway) in response to a message or set of messages from an external client that initiates a connection with the workload. The data message is sent using the internal logical network address of the workload and, in some embodiments, routed by a public cloud underlay network to the edge node based on the source address rather than the destination address (to avoid routing the data message to one of the other edge nodes for the logical network).

Figure 6:
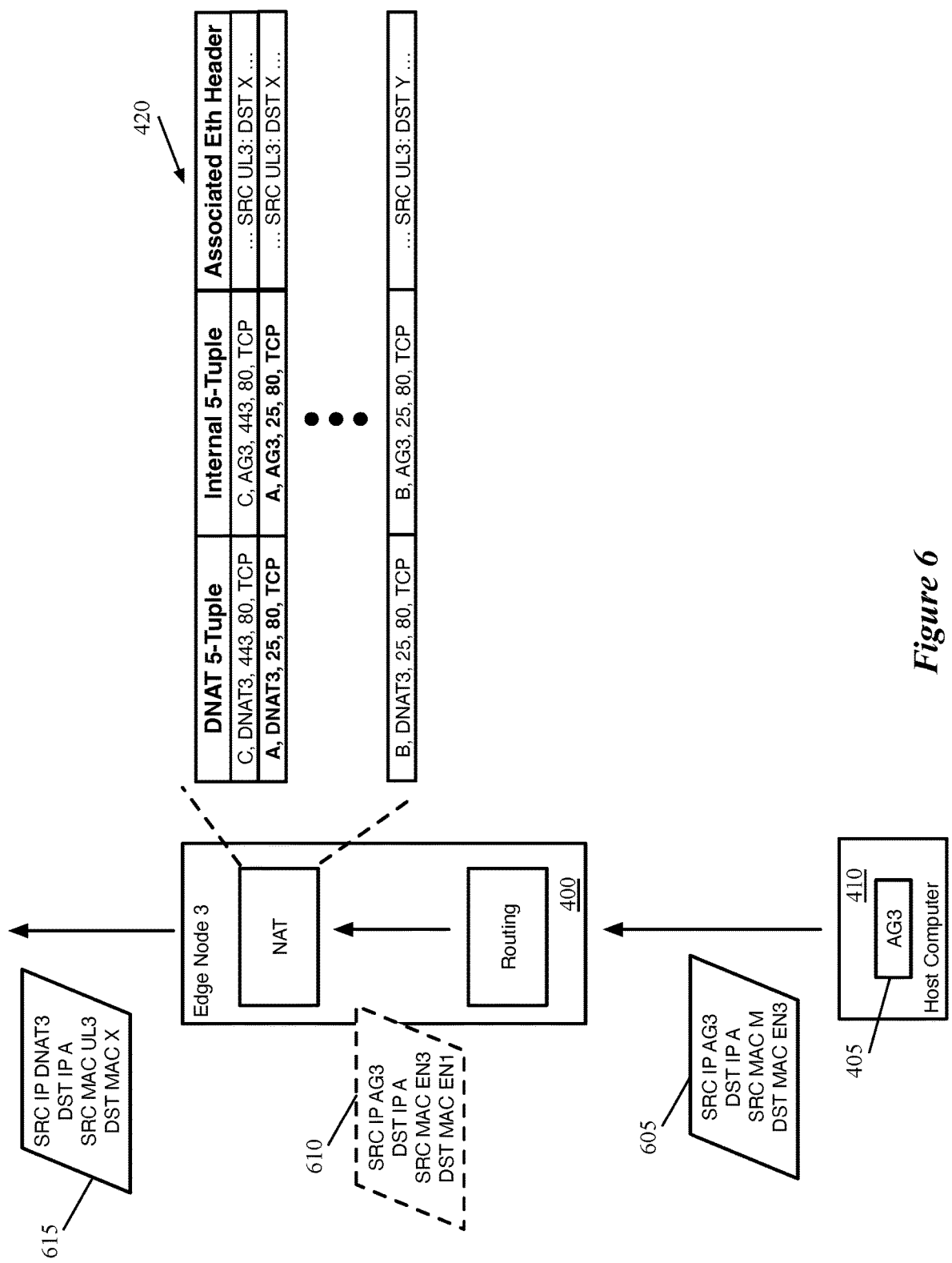
FIG. 6 conceptually illustrates the use of the NAT entry created in FIG. 4 for a return data message.

FIG. 6 shows that the application gateway 405 executing on the host computer 410 has sent a data message (via the public cloud underlay network) to the edge node. This data message has source IP address AG3 and destination IP address A. After policy-based routing in the public cloud underlay network (not shown) based on the source IP address, the source MAC address is M and the destination MAC address is EN3 (the MAC address of the internal interface of the edge node).

The process 500 then performs (at 510) services on the data message and routes the data message to a second edge node (i.e., the default edge node) via an intra-cluster interface of the edge node. Whereas for incoming data messages, NAT is performed at the start of the pipeline (before routing/switching), for outgoing data messages NAT is performed at the end of this pipeline. Services (e.g., firewall services, etc.) are performed, in addition to logical routing and switching). As described previously, the routing performed by the edge node datapath for outgoing data messages routes these data messages to the second (default) edge node in some embodiments based on a default route. The default route is configured on the edge nodes based on the provision of VPN, DNS, or other services at the specific edge node that cannot be scaled to all of the nodes in the cluster.

This creates an issue in that the data messages on which NAT is being performed do not need these services (VPN, DNS, etc.) applied and should be output by the same edge node that performs the DNAT and stores the stateful NAT entry, rather than the default edge node. The edge node that performs DNAT and to which the data message is initially routed by the public cloud underlay is the edge node with the uplink interface having the public NAT address used by the connection, whereas the default edge node has a different public NAT address.

FIG. 6 shows that after the edge datapath routes the data message 605 this data message (as stored internally to the edge node in memory) has a source MAC address EN3 (corresponding to the internal network interface of the edge node 400) and a destination MAC address EN1 (corresponding to the internal network interface of the default edge node). Based on this modified Ethernet header, the edge node 400 would output the data message back onto the internal public underlay cloud underlay network (via its internal interface) and the data message would be delivered to the default edge node.

One option to handle this problem is for the edge node datapath to generate a new routing table entry for each of these connections that routes data traffic for the connection to an external router (e.g., based on this data traffic having the source network address of the initial incoming data message as its destination network address). However, this technique can become difficult to manage when the number of connections is large, as a new route needs to be defined for each external address that connects to the logical network workloads. Instead, as described by reference to FIG.

3, some embodiments store an Ethernet header along with the NAT entry that redirects the data message to a different output interface.

Returning to FIG. 5, the process 500 determines (at 515) whether the current 5-tuple of the data message (which still has the internal network address) matches a stored NAT entry. As described above, these NAT entries are generated by the edge node upon receiving a connection initiation message from the external source (e.g., the client). Some embodiments store a different flow identifier than a 5-tuple (e.g., a 4-tuple that removes one of the port numbers) and match the data messages against these other flow identifiers. If no matching NAT entry is found, then NAT is not performed on the data message and the process 500 forwards (at 520) the data message (assuming it is not blocked or dropped by any firewall processing) to the default edge node via the intra-cluster interface. The default edge node can then perform any additional processing and output the data message to the external logical network (e.g., via a VPN).

If the first edge node finds a matching NAT entry for the outgoing data message, however, the process 500 modifies (at 525) the source network address of the data message according to the NAT entry. That is, the edge node datapath performs reverse DNAT on the data message, changing the network address from the internal logical network address to the public DNAT address. This will enable the recipient of the data message (the external client) to process the data message upon receipt. In some embodiments, the source and/or destination port numbers are also modified by the NAT operation.

In addition, the process 500 redirects (at 530) the data message to the uplink interface by replacing the current Ethernet header of the data message with a stored header that is associated with the NAT entry. That is, rather than outputting the data message via the intra-cluster interface used for communication with other edge nodes (and sending the data message to the default edge node), the first edge node outputs the data message via its uplink interface connected to the external network (i.e., the interface via which the initial incoming data message was received). As described above, when the initial connection-initiation message is received from the external network, the edge node stores the data link layer (e.g., Ethernet) header with the source and destination MAC addresses reversed. For the outgoing data messages, replacing the post-routing Ethernet header with this stored Ethernet header enables the edge node datapath to perform post-routing MAC redirection at the NAT processing stage.

Finally, the process 500 forwards (at 535) the data message to the external network via the uplink interface of the first edge node, then ends. Because the source MAC address of the data message now corresponds to the uplink interface, the data message is output via this uplink interface rather than the internal intra-cluster interface of the edge node that connects to the other edge nodes.

In the example of FIG. 6, the data message 610 as stored by the edge node 400 after routing has a source MAC address EN3 (corresponding to the internal network interface of the edge node 400) and a destination MAC address EN1 (corresponding to the internal network interface of the default edge node). At the NAT processing stage, the edge node 400 matches the internal logical network 5-tuple with the NAT entry previously created based on an incoming data message as shown in FIG. 4 (this NAT entry is shown in bold in the table 420). Based on this NAT entry, the edge node 400 modifies the source IP address from the logical network endpoint address AG3 to be the public NAT address DNAT3. In addition, the edge node 400 replaces the Ethernet header of the data message using the stored Ethernet header associated with the NAT entry so that the data message is correctly output via the uplink interface of the edge node. As shown, the modified data message 615 that is output by the edge node not only has its source IP modified by the NAT operation, but also has a source MAC address UL3 and a destination MAC address X, such that the data message 615 has been redirected to the uplink interface rather than the intra-cluster (EN3) interface of the edge node.

Figure 7:
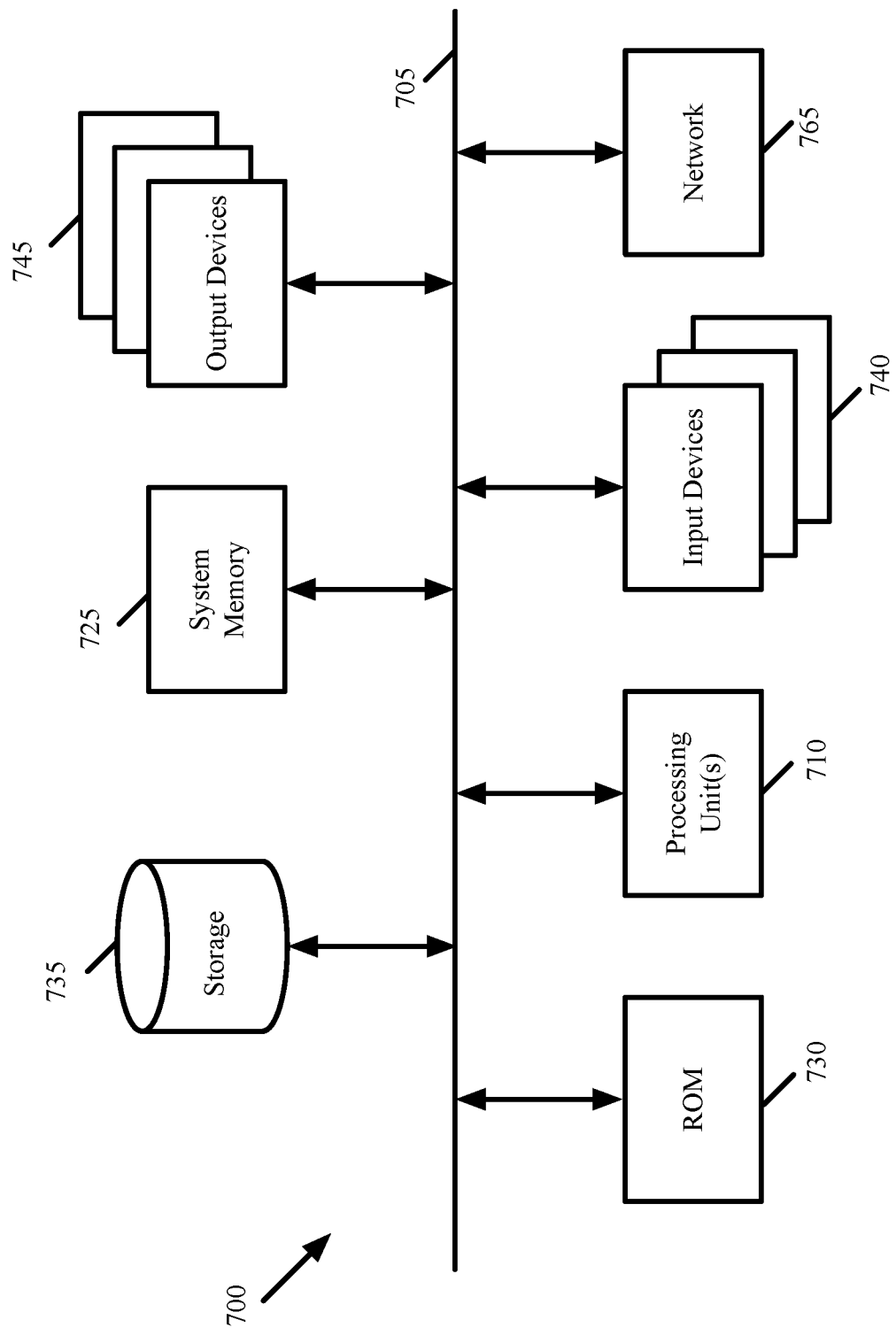
FIG. 7 conceptually illustrates an electronic system with which some embodiments of the invention are implemented.

FIG. 7 conceptually illustrates an electronic system 700 with which some embodiments of the invention are implemented. The electronic system 700 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 700 includes a bus 705, processing unit(s) 710, a system memory 725, a read-only memory 730, a permanent storage device 735, input devices 740, and output devices 745.

The bus 705 collectively represents all system, peripheral, and chipset buses that communicatively connect the numerous internal devices of the electronic system 700. For instance, the bus 705 communicatively connects the processing unit(s) 710 with the read-only memory 730, the system memory 725, and the permanent storage device 735.

From these various memory units, the processing unit(s) 710 retrieve instructions to execute and data to process in order to execute the processes of the invention. The processing unit(s) may be a single processor or a multi-core processor in different embodiments.

The read-only-memory (ROM) 730 stores static data and instructions that are needed by the processing unit(s) 710 and other modules of the electronic system. The permanent storage device 735, on the other hand, is a read-and-write memory device. This device is a non-volatile memory unit that stores instructions and data even when the electronic system 700 is off. Some embodiments of the invention use a mass-storage device (such as a magnetic or optical disk and its corresponding disk drive) as the permanent storage device 735.

Other embodiments use a removable storage device (such as a floppy disk, flash drive, etc.) as the permanent storage device. Like the permanent storage device 735, the system memory 725 is a read-and-write memory device. However, unlike storage device 735, the system memory is a volatile read-and-write memory, such a random-access memory. The system memory stores some of the instructions and data that the processor needs at runtime. In some embodiments, the invention's processes are stored in the system memory 725, the permanent storage device 735, and/or the read-only memory 730. From these various memory units, the processing unit(s) 710 retrieve instructions to execute and data to process in order to execute the processes of some embodiments.

The bus 705 also connects to the input and output devices 740 and 745. The input devices enable the user to communicate information and select commands to the electronic system. The input devices 740 include alphanumeric keyboards and pointing devices (also called "cursor control devices"). The output devices 745 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 7, bus 705 also couples electronic system 700 to a network 765 through a network adapter (not shown). In this manner, the computer can be a part of a network of computers (such as a local area network ("LAN"), a wide area network ("WAN"), or an Intranet, or a network of networks, such as the Internet. Any or all components of electronic system 700 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

While the invention has been described with reference to numerous specific details, one of ordinary skill in the art will recognize that the invention can be embodied in other specific forms without departing from the spirit of the invention. In addition, a number of the figures (including FIGS. 3 and 5) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A method for forwarding data messages at a plurality of edge gateways of a logical network that process data messages between the logical network and an external network, the method comprising:

at a first one of the edge gateways:
receiving a data message from the logical network, the data message having an external address as a destination address;
based on the external destination address, applying a default route to the data message that routes the data message to a second one of the edge gateways and specifies a first output interface of the first edge gateway for the data message; and
after routing the data message, applying a stored network address translation (NAT) entry that (i) modifies a source address of the data message to be a public NAT address associated with the first edge gateway and (ii) redirects the modified data message to a second output interface of the first edge gateway instead of the first output interface of the first edge gateway.

2. The method of claim 1, wherein:
the first output interface is an interface for traffic between the first edge gateway and other edge gateways; and the second output interface is an uplink interface for connecting to external networks.

3. The method of claim 1, wherein the data message is a first data message, wherein the method further comprises, prior to receiving the first data message:
receiving a second data message from the external network having the external address as a source address and the public NAT address as a destination address;
performing NAT on the second data message to modify the destination address to be a logical network address associated with a particular machine in the logical network; and
storing the NAT entry mapping the logical network address to the public NAT address for a data message flow to which the first and second data messages belong.

4. The method of claim 3, wherein the stored NAT entry identifies the data message flow based on source and destination network addresses, source and destination transport layer port numbers, and transport layer protocol.

5. The method of claim 1, wherein the logical network is implemented in a virtual datacenter configured on a set of host computers in a public cloud, the virtual datacenter comprising (i) a set of workloads executing on the host computers and (ii) the plurality of edge gateways executing on the host computers.

6. The method of claim 5, wherein:
the virtual datacenter workloads comprise (i) a set of network management components and (ii) a set of logical network endpoints connected by the logical network; and
the logical network is managed by the network management components of the virtual datacenter.

7. The method of claim 5, wherein the external address corresponds to a virtual desktop client connecting to a shared resource operating on one or more workloads in the virtual datacenter.

8. The method of claim 7, wherein the shared resource receives a plurality of connections from a plurality of virtual desktop clients via the plurality of edge gateways.

9. The method of claim 5, wherein the default route routes the data message to the second edge gateway because the second edge gateway provides a set of services for the virtual datacenter workloads that are not scaled to all of the edge gateways.

10. The method of claim 9, wherein the set of services comprises at least one of domain name service (DNS) and virtual private network (VPN) service.

11. The method of claim 1, wherein:
applying the stored NAT entry to redirect the modified data message to the second output interface comprises modifying media access control (MAC) addresses of the modified data message; and
a source MAC address corresponds to the first output interface prior to modification and corresponds to the second output interface after modification.

12. The method of claim 11, wherein:
the data message is a first data message;
the stored NAT entry comprises a data link layer header based on a second data message previously received from the external network.

13. The method of claim 1, wherein the plurality of edge gateways comprises at least two groups of edge gateways, each group associated with a different NAT address.

14. The method of claim 13, wherein the first and second edge gateways belong to different groups.

15. A non-transitory machine-readable medium storing a program for execution by at least one processing unit of a host computer that implements a first edge gateway of a plurality of edge gateways of a logical network that process data messages between the logical network and an external network, the program comprising sets of instructions for:
receiving a data message from the logical network, the data message having an external address as a destination address;
based on the external destination address, applying a default route to the data message that routes the data message to a second one of the edge gateways and specifies a first output interface of the first edge gateway for the data message; and
after routing the data message, applying a stored network address translation (NAT) entry that (i) modifies a source address of the data message to be a public NAT address associated with the first edge gateway and (ii) redirects the modified data message to a second output interface of the first edge gateway instead of the first output interface of the first edge gateway.

16. The non-transitory machine-readable medium of claim 15, wherein:
the first output interface is an interface for traffic between the first edge gateway and other edge gateways; and
the second output interface is an uplink interface for connecting to external networks.

17. The non-transitory machine-readable medium of claim 15, wherein the data message is a first data message, wherein the program further comprises sets of instructions for, prior to receipt of the first data message:
receiving a second data message from the external network having the external address as a source address and the public NAT address as a destination address;
performing NAT on the second data message to modify the destination address to be a logical network address associated with a particular machine in the logical network; and
storing the NAT entry mapping the logical network address to the public NAT address for a data message flow to which the first and second data messages belong.

18. The non-transitory machine-readable medium of claim 15, wherein the logical network is implemented in a virtual datacenter configured on a set of host computers in a public cloud, the virtual datacenter comprising (i) a set of workloads executing on the host computers and (ii) the plurality of edge gateways executing on the host computers.

19. The non-transitory machine-readable medium of claim 18, wherein:
the external address corresponds to a virtual desktop client connecting to a shared resource operating on one or more workloads in the virtual datacenter; and
the shared resource receives a plurality of connections from a plurality of virtual desktop clients via the plurality of edge gateways.

20. The non-transitory machine-readable medium of claim 18, wherein the default route routes the data message to the second edge gateway because the second edge gateway provides a set of services for the virtual datacenter workloads that are not scaled to all of the edge gateways.

21. The non-transitory machine-readable medium of claim 15, wherein:
the set of instructions for applying the stored NAT entry to redirect the modified data message to the second output interface comprises a set of instructions for modifying media access control (MAC) addresses of the modified data message; and a source MAC address corresponds to the first output interface prior to modification and corresponds to the second output interface after modification.

22. The non-transitory machine-readable medium of claim 21, wherein:

the data message is a first data message;

the stored NAT entry comprises a data link layer header based on a second data message previously received from the external network.

23. The non-transitory machine-readable medium of claim 15, wherein the plurality of edge gateways comprises at least two groups of edge gateways, each group associated with a different NAT address.

* * * * *